(12) United States Patent
Dickey

(10) Patent No.: US 10,666,042 B2
(45) Date of Patent: May 26, 2020

(54) ELIMINATION OF SECONDARY FUSES IN HIGH POWER SOLID STATE POWER CONTROLLERS

(71) Applicant: Hamilton Sundstrand Corporation, Charlotte, NC (US)

(72) Inventor: John A. Dickey, Caledonia, IL (US)

(73) Assignee: HAMILTON SUNSTRAND CORPORATION, Charlotte, NC (US)

(*) Notice: Subject to any disclaimer, the term of this patent is extended or adjusted under 35 U.S.C. 154(b) by 275 days.

(21) Appl. No.: 15/622,161

(22) Filed: Jun. 14, 2017

(65) Prior Publication Data
US 2018/0366941 A1 Dec. 20, 2018

(51) Int. Cl.
| | | |
|---|---|---|
| *H02H 7/00* | (2006.01) | |
| *H02H 9/00* | (2006.01) | |
| *H02H 7/12* | (2006.01) | |
| *H02H 3/04* | (2006.01) | |
| *H02H 3/06* | (2006.01) | |

(52) U.S. Cl.
CPC .......... *H02H 7/1203* (2013.01); *H02H 3/044* (2013.01); *H02H 3/066* (2013.01)

(58) Field of Classification Search
CPC .................................................. H02H 7/1203
USPC .......................................................... 361/18
See application file for complete search history.

(56) References Cited

U.S. PATENT DOCUMENTS

| | | | |
|---|---|---|---|
| 8,519,686 B2* | 8/2013 | Rozman | H03K 17/122 323/234 |
| 8,861,162 B2 | 10/2014 | Fuller et al. | |
| 8,891,218 B2 | 11/2014 | Holley et al. | |
| 2007/0236852 A1* | 10/2007 | Plivcic | H02J 1/14 361/115 |
| 2012/0063180 A1 | 3/2012 | Mizuno | |
| 2013/0049457 A1* | 2/2013 | Komatsu | H02J 7/0014 307/9.1 |
| 2014/0103990 A1 | 4/2014 | Holley | |
| 2014/0226248 A1 | 8/2014 | Hameed | |

FOREIGN PATENT DOCUMENTS

| | | |
|---|---|---|
| CN | 202524169 U | 11/2012 |
| EP | 2843837 A1 | 3/2015 |
| WO | 2017060217 A1 | 4/2017 |

OTHER PUBLICATIONS

Extended European Search Report, International Appl. No. 18177538.8-1202, dated Nov. 26, 2018, 9 pages.

* cited by examiner

*Primary Examiner* — Thienvu V Tran
*Assistant Examiner* — Lucy M Thomas
(74) *Attorney, Agent, or Firm* — Cantor Colburn LLP

(57) ABSTRACT

Embodiments include a technique for eliminating secondary fuses in high power solid state power controllers, the technique includes controlling gate power provided to a field effect transistor array, and detecting a failure mode. The technique also includes disabling the gate power based at least in part on detecting the failure mode, and restoring the gate power responsive to resolving the failure mode.

17 Claims, 4 Drawing Sheets

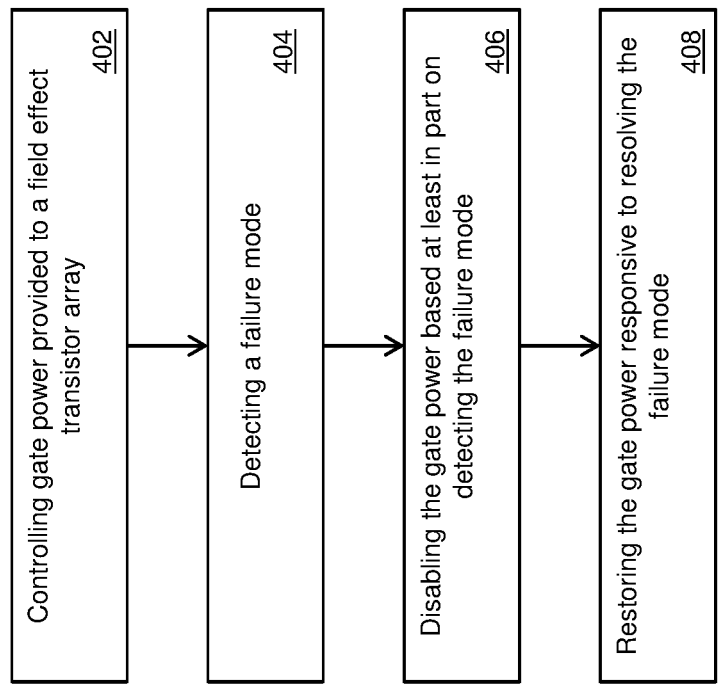

ELIMINATION OF SECONDARY FUSES IN HIGH POWER SOLID STATE POWER CONTROLLERS

BACKGROUND

One or more embodiments pertain to the art of protection circuits, and specifically, to the elimination of secondary fuses in high power solid state power controllers.

In today's environment, solid state power controllers (SSPC) are used to control power that is supplied to a connected load. The SSPCs can control the voltage and/or current supplied to the load, and can provide protections to power systems by identifying overload conditions and preventing short circuits in the system. SSPCs provide optimal restoration time after a failure occurs and is no longer detected. The rapid restoration time returns the operation of mission-critical loads to the power systems after the failure has been resolved. Power system applications that use SSPCs include the power systems of aircrafts and vehicles. Fuses and fuse links have been used to provide protection in SSPCs for shorted field effect transistors (FET) or other failure modes. This configuration can provide a backup mode in the case of an overcurrent condition. The SSPCs also provide additional functionality and performance advantages over other protection components. For example, other protection components such as breakers and relays are limited in their usability when compared to the versatility of SSPCs.

BRIEF DESCRIPTION

Disclosed is a system for eliminating secondary fuses in high power solid state power controllers, the system includes a gate power supply coupled to a gate switch, and a primary controller coupled to a gate driver, wherein the gate driver is coupled to a field effect transistor array. The system also includes a secondary controller for controlling the gate switch based on detecting a failure mode, wherein the gate switch is coupled to the gate driver, and at least one sensor for detecting the failure mode, wherein the at least one sensor is coupled to the primary controller and the secondary controller.

Also disclosed is a method for eliminating secondary fuses in high power solid state power controllers, the method includes controlling gate power provided to a field effect transistor array, and detecting a failure mode. The method includes disabling the gate power based at least in part on detecting the failure mode, and restoring the gate power responsive to resolving the failure mode.

BRIEF DESCRIPTION OF THE DRAWINGS

The following descriptions should not be considered limiting in any way. With reference to the accompanying drawings, like elements are numbered alike:

FIG. 4 depicts a method for the elimination of secondary fuses in high power SSPCs in accordance with one or more embodiments.

DETAILED DESCRIPTION

Figure 1:
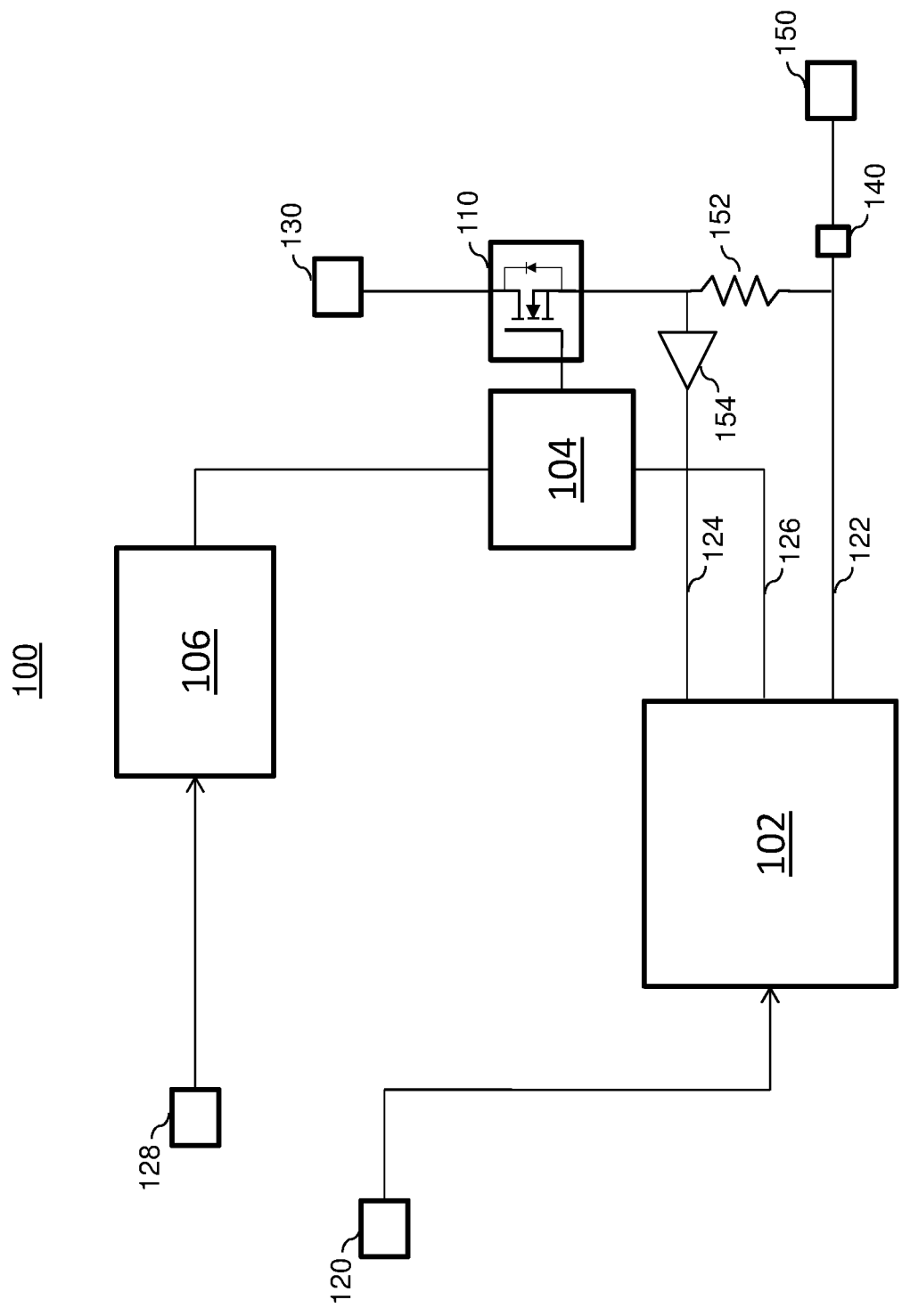
FIG. 1 depicts a block diagram of a prior art system incorporating secondary fuses in solid state power controllers (SSPC)

Solid state power controllers (SSPC) provide a wide range of operability for different applications where the SSPCs can be used in both high power and low power applications. In the event of a field effect transistor (FET) short, the bond wires to each of the individual FETs will open. In high powered SSPCs, the bond wires have been known to open on a shorted FET during a normal load due to the higher current flowing through the wires. In a low power SSPCs, a shorted FET may not open into a study state load which results in the channel connected to the load remaining in the ON state.

Currently, there is no protection for failure modes where the gate driver is shorted ON or when a primary controller malfunctions and commands the gate power to remain ON at all times. This is a problem being addressed by one or more embodiments described herein. The gate driver can be used to drive a FET array having a plurality of FETs. When the gate driver receives a command to power ON the FET array, the power can be supplied to each of the FETs. In the event, the gate driver is shorted ON, all of the devices of the FET array will be turned ON. This requires a very high fault current in order for each of the fuse links that are coupled to each FET in the FET array to open up. When all of the devices are turned ON, a very high fault current can occur which requires a larger fuse and/or fuse link to be used. This does not coordinate well with the wire when used in high power applications. As the size of the fuses get larger for high power system protection, the amount of board space that is used and the amount of heat dissipation from the fuses increases. This configuration will prove to be unworkable as high power applications are implemented. Also, if a secondary fuse is used for protecting the circuit, after the fuse opens, the channel connected to the load will be unavailable because of the opened fuse. In this example, the blown fuse must be replaced prior to restoring normal operation.

In the event a single FET is shorted in a large array, the shorted FET holds the channel in an ON state where the channel is coupled to a load. When the remaining FETs of the array are turned OFF, the remaining load current is funneled through the shorted FET. The increase in the current through the shorted FET causes the FET to open. The remaining FETs in the array and the channel that is coupled to the load are still functional. Upon restoring the gate power to the FET array, normal operation can resume. In this scenario, the secondary controller can detect the fault and switch the gate power OFF that is supplied to the remaining FETs in the array. However, if a single secondary fuse were to be used and the fuse opened, the channel would not be operational after the fuse has blown open. In the previously described configuration, the individual FETs of the FET array act as fuses without requiring a large secondary fuse to be incorporated into the system.

In one or more embodiments, the secondary controller can determine a fault based on the current state of the system and disable the gate driver when the secondary controller detects a fault condition. The secondary controller is configured to prevent a gate from being stuck on which is controlled by the primary controller. A detailed description of one or more embodiments of the disclosed apparatus and method are presented herein by way of exemplification and not limitation with reference to the Figures.

Now referring to FIG. 1, a prior art system 100 incorporating secondary fuses 140 is shown. As shown, the system 100 includes a primary controller 102. The primary controller 102 is configured to receive system commands 120 from a source for controlling the gate driver 104. The primary controller 102 controls the gate driver 104 through a primary control signal 126. The primary controller 102 is also configured to receive a load voltage signal 122 and load current 124 from a current sensor amplifier 154 and a sensor 152. The combination of these signals can indicate the current state of the system 100.

The gate driver 104 receives power from a gate power supply 106 being which receives power form a control supply 128. The gate driver 104 is coupled to the FET array 110. The FET array 110 can be comprised of a plurality of FETs. In an embodiment, the FETs can be any known type of transistor, device, switch, etc. The FET array 110 receives a feed signal 130 which can be provided to the load 150.

In the event of a failure along with an overcurrent fault, the fuse 140 can open to disconnect the channel coupling the load 150 in the system 100. However, after the fuse 140 has opened the channel that is connected to the load 150 is unavailable. In high power applications, the system 100 requires larger fuses 140 to be used to provide the overload protection. The larger the fuses 140 become, the higher the heat dissipation becomes that is associated with the fuse 140.

Figure 2:
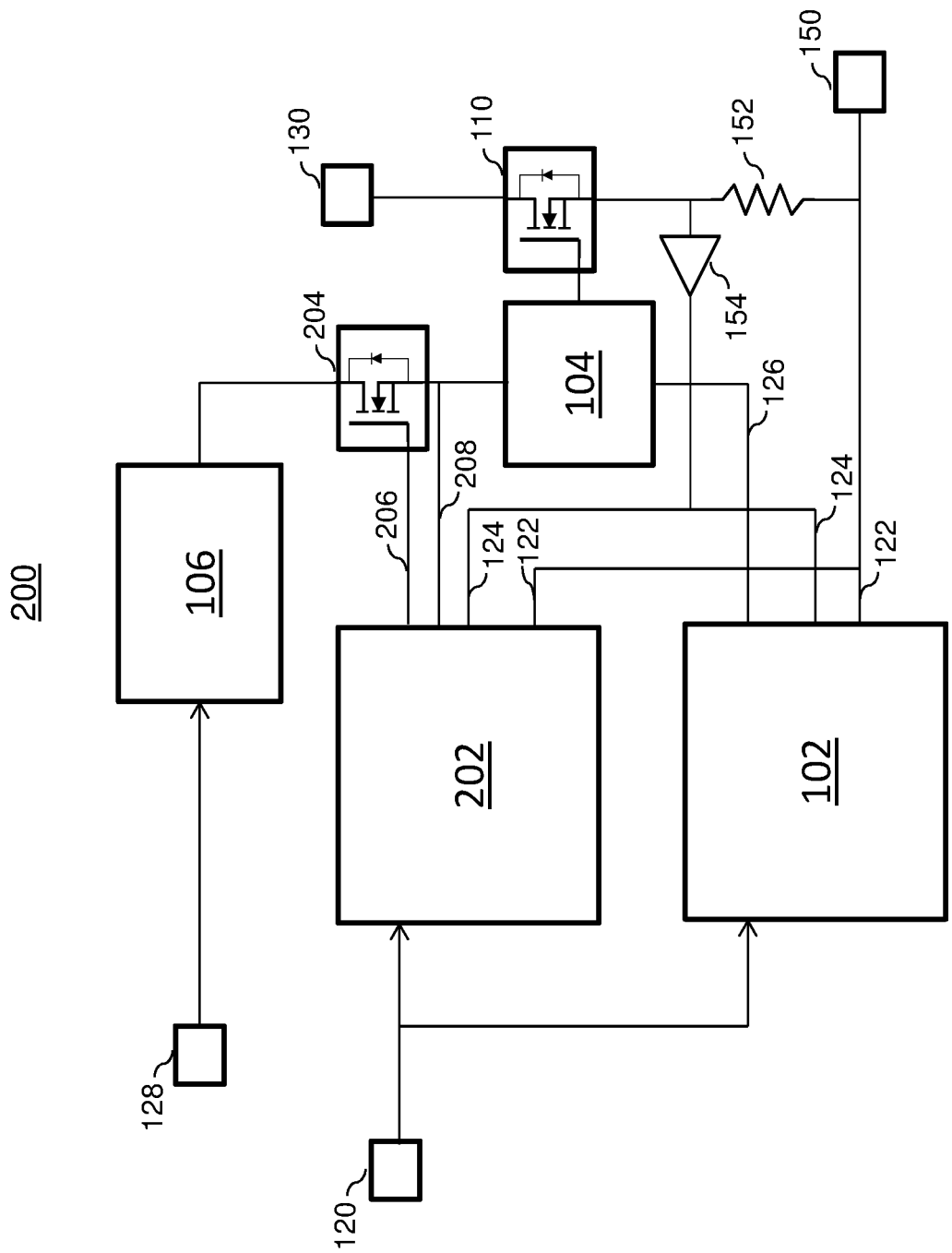
FIG. 2 depicts a block diagram of a system for the elimination of secondary fuses in high power SSPCs in accordance with one or more embodiments.

Now referring to FIG. 2, a system 200 for eliminating secondary fuses in a high power SSPC in accordance with one or more embodiments is shown. As shown in FIG. 2, a secondary controller 202 and gate switch 204 is integrated into the system 200. The primary controller 102 and the secondary controller 202 can be solid state power controllers. In one or more embodiments, the secondary controller 202 is configured to receive the same system command signals 120 as the primary controller 102. In addition, the secondary controller 202 is configured to receive a load voltage signal 122 and the load current signal 124 from at least one connected load 150. In one or more embodiments, the secondary fuse 140 (shown in FIG. 1) is eliminated from the system 200. The overload protection is provided by the secondary controller 202 and the gate switch 204. The gate power can be detected by the secondary controller 202 through the signal 208. The configuration of the FETs in the FET array 110 can affect the power system overload protection operation. In a non-limiting example, smaller FETs can be used in the FET array 110 to increase the channel availability during a failure mode caused by an FET of the FET array 110 having short circuited. After the gate power is removed from the remaining FETs of the FET array 110, under control of the secondary controller 202, the shorted FET will open and the channel will still be operational after power is restored to the remaining FETs.

The secondary controller 202 controls the gate switch 204 based on detecting a fault or failure mode in the system 200. In the event a failure is detected by the secondary controller 202, the secondary controller 202 can provide a signal 206 to the gate switch 204 to disable the gate power supplied to the gate driver 104. The signal 206 can also be used to enable the gate switch 204 to allow the gate power to be provided to the gate driver 104.

The secondary controller 202 is configured to receive the command signals 120 so the secondary controller 202 will know when the FET array 110 is to be powered ON and when the FET array 110 is to be powered OFF. For example, the secondary controller 202 will be able to detect a fault in the event the FET array 110 is receiving gate power when in an OFF state.

In one or more embodiments, the gate switch 204 can be located in different positions relative to the gate power supply 106. In an embodiment, the gate switch 204 can be located between the control supply 128 and upstream of the gate power supply 106. In a different embodiment, the gate switch 204 can be located between the gate power supply 106 and upstream of the gate driver 104. In one or more of the configurations, the gate switch 204 is coupled and controlled by the secondary controller 202. In the event a failure mode is detected, the secondary controller 202 opens the gate switch 204 to disable the gate power from being provided to the FET driver 104 and FET array 110 until the failure mode has been resolved. In a different embodiment, the gate power supply 106 can include an enable line to control the gate power where the enable line is controlled by the secondary controller 202.

In another embodiment, a FET in the FET array 110 can open during a failure mode which protects the system from the overload condition. After this FET blows open, the other FETs and channel coupled to the load will remain operational even though the single FET is open. This availability cannot be realized when using a single large secondary fuse. In this configuration, the FETs themselves become the fuse, and once opened the channel is operational again less the one opened FET in the array 110. The techniques described herein avoid the use of secondary fuses for implementing circuit protection from overcurrent that may occur in the system.

Figure 3:
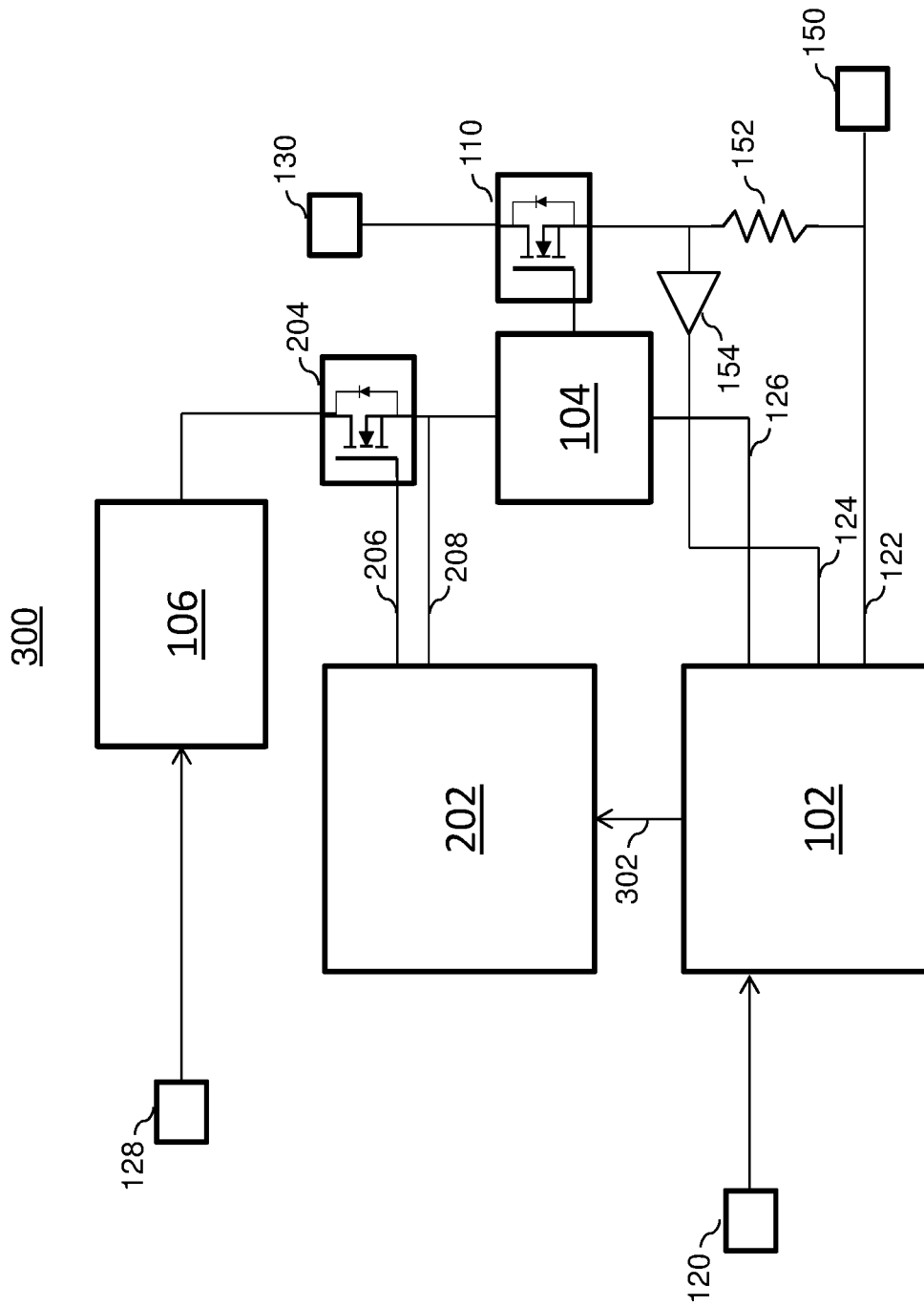
FIG. 3 depicts a block diagram for the elimination of secondary fuses in high power SSPCs in accordance with one or more embodiments.

Now referring to FIG. 3, a system 300 for eliminating secondary fuses in high power SSPCs in accordance with one or more embodiments is shown. In the configuration shown in FIG. 3, the secondary controller 202 is coupled to the primary controller 102 and is configured to receive a watchdog signal 302. A watchdog signal is a timer that is used to detect computer malfunctions. During normal operation, the watchdog signal is regularly pulsed to prevent it from elapsing or "timing out."

In the event of a failure in the primary controller 102 is detected, the secondary controller 202 provides a signal 206 to the gate switch 204 to remove the gate power being supplied to the FET array 110. In one or more embodiments, the configurations of FIG. 2 can include the use of a watchdog signal 302.

Now referring to FIG. 4, a method 400 for eliminating the use of secondary fuses in SSPCs in accordance with one or more embodiment is shown. Block 402 provides controlling gate power provided to a FET array. In one or more embodiment, the secondary controller can control the gate power by controlling a gate switch that is coupled to a gate driver that provides the gate power to the FET array.

Block 404 provides detecting a failure mode. In one or more embodiments, a secondary controller can be used to detect a failure mode of the system. A non-limiting example of the failure mode is based on the failure or malfunctioning of a gate power supply. Another non-limiting example of a failure mode is a failed FET in the FET array which couples a feed signal to a load. In another embodiment, the secondary controller can compare the current state of the system with the configured state of the system based on receiving common signals the primary controller receives such as the command signal, load current, load voltage, etc.

Block 406 provides disabling the gate power based at least in part on detecting the failure mode. In an embodiment, the secondary controller disables the gate power that is provided to the FET array upon detection of the failure mode and during the failure mode. Block 408 provides restoring the gate power responsive to resolving the failure mode.

In one or more embodiments, the elimination of any secondary protection fuse components reduces the board space taken for providing overload protection particularly in high power applications that require larger fuses for protection. Because the large secondary fuses are eliminated from the circuit, the heat dissipation associated with large secondary fuses is also removed. In addition, the higher availability of the channel is maintained by allowing the individual FETS of large FET arrays to clear their own faults while the other FETs and channels remain viable to complete the mission.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for eliminating secondary fuses in high power solid state power controllers, the system comprises:
   a gate power supply coupled to a gate switch;
   a primary controller coupled to a gate driver and configured to control the gate driver, wherein the gate driver is coupled to a field effect transistor (FET) array; and
   a secondary controller for controlling the gate switch based on detecting a failure mode, wherein the gate switch is coupled to the gate driver, wherein the primary controller and the secondary controller receive common command signals via a common bus, wherein the primary controller and the secondary controller are configured to receive a load voltage and a load current.

2. The system of claim 1, wherein the secondary controller is configured to disable the gate switch based at least in part on detecting the failure mode.

3. The system of claim 1, wherein the secondary controller is configured to receive a load voltage signal, a load current signal, and a system command signal.

4. The system of claim 1, wherein the secondary controller is configured to receive watchdog signals from the primary controller, wherein the watchdog signal indicates the primary controller is functioning properly.

5. They system of claim 1, wherein the secondary controller is prevented from receiving a load voltage signal, a load current signal, and a system command signal and is configured to receive watchdog signals from the primary controller, wherein the watchdog signal indicates the primary controller is functioning properly.

6. The system of claim 1, wherein the gate power supply includes an enable input controlled by the secondary controller.

7. The system of claim 1, wherein the gate switch is positioned downstream of the gate power supply.

8. The system of claim 1, wherein the gate switch is positioned upstream of the gate power supply.

9. The system of claim 1, further comprises at least one sensor for detecting the failure mode, wherein the at least one sensor is coupled to the primary controller and the secondary controller.

10. The system of claim 9, wherein the at least one sensor is one of a current sensor amplifier or a voltage sensor.

11. A method for eliminating secondary fuses in high power solid state power controllers, the method comprises:
    operating a primary controller and a secondary controller, wherein the primary controller and the secondary controller receive common command signals via a common bus, wherein the primary controller controls a gate drive coupled to a gate switch, wherein the secondary controller controls the gate switch, wherein the primary controller and the second controller are configured to receive a load voltage and a load current;
    controlling gate power provided to a field effect transistor (FET) array;
    detecting, via a secondary controller, a failure mode;
    disabling the gate power based at least in part on detecting the failure mode; and
    restoring the gate power responsive to resolving the failure mode.

12. The method of claim 11, wherein the failure mode is associated with a gate driver providing the gate power to the FET array, disabling the gate power via a secondary controller.

13. The method of claim 11, wherein detecting the failure mode is based at least in part on a received load voltage signal, load current signal, and a system command signal.

14. The method of claim 11, wherein detecting the failure mode is based at least in part on a watchdog signal received from the primary controller, wherein the watchdog signal indicates the primary controller is functioning properly.

15. The method of claim 11, further comprises controlling the gate power provided to the FET array by an enable line of a gate power supply.

16. The method of claim 11, wherein protecting the circuit does not require a secondary fuse.

17. The method of claim 11, further comprises responsive to a FET of the FET array having opened due to an overload condition, maintaining the operability of a channel coupled to a load.

* * * * *